(12) United States Patent
Chien

(10) Patent No.: US 7,302,852 B2
(45) Date of Patent: Dec. 4, 2007

(54) VIBRATION MEASURING AND MONITORING SYSTEM

(75) Inventor: Yang-Chang Chien, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/438,012

(22) Filed: May 19, 2006

(65) Prior Publication Data

US 2007/0051178 A1 Mar. 8, 2007

(30) Foreign Application Priority Data

Sep. 2, 2005 (CN) ....................... 200510037036.8

(51) Int. Cl.
*G01H 9/00* (2006.01)
*G01N 29/04* (2006.01)
(52) U.S. Cl. ............................ 73/643; 73/653; 73/655; 73/657
(58) Field of Classification Search ................ None
See application file for complete search history.

(56) References Cited

U.S. PATENT DOCUMENTS

| | | | | |
|---|---|---|---|---|
| 3,375,376 A | * | 3/1968 | Kermode | 250/231.1 |
| 3,709,030 A | * | 1/1973 | Aselman, Jr. | 73/653 |
| 4,083,255 A | * | 4/1978 | McKechnie | 73/655 |
| 4,379,226 A | * | 4/1983 | Sichling et al. | 250/231.1 |
| 4,567,771 A | * | 2/1986 | Nelson et al. | 73/653 |
| 4,872,348 A | * | 10/1989 | Curry | 73/653 |
| 5,359,445 A | * | 10/1994 | Robertson | 250/227.14 |
| 6,722,209 B1 | * | 4/2004 | Fan et al. | 73/861.355 |
| 7,117,751 B2 | * | 10/2006 | Berger et al. | 73/861.355 |
| 7,168,323 B1 | * | 1/2007 | Discenzo | 73/655 |
| 2005/0052724 A1 | * | 3/2005 | Suzuki et al. | 359/305 |

* cited by examiner

*Primary Examiner*—Hezron Williams
*Assistant Examiner*—Rose M Miller
(74) *Attorney, Agent, or Firm*—Jeffrey T. Knapp

(57) ABSTRACT

A vibration measuring and monitoring system (100) for an object (20) includes a laser unit (11), a laser sensor unit (12), and a processor (15). The laser unit is used for emitting a laser beam (13). The laser sensor unit is used for receiving the laser beam, and the laser sensor detects a light intensity signal of the laser beam. The processor is used for processing the light intensity signal of the laser beam. The object is partially disposed between the laser unit and the laser sensor unit. The laser beam crosses the object and is received by the laser sensor unit. The processor obtains a vibration signal by processing the light intensity signal.

19 Claims, 4 Drawing Sheets

VIBRATION MEASURING AND MONITORING SYSTEM

TECHNICAL FIELD

The present invention generally relates to monitoring systems and, more particularly, to a vibration measuring and monitoring system.

BACKGROUND

Vibration measuring and monitoring systems are widely used in many fields, such as mechanics, electrics, architecture, and geology. Electronics is another field in which they are increasingly being used. Precision tools are used to treat components of the electronic devices, typically have a principal axis for operating on the components of the electronic devices. The principal axis often rotates at high speed when treating components and has a constant frequency. If the frequency of the precision tools is equal to the frequency of the principal axis, positive interference of vibration will occur in the precision tools and the principal axis. The vibration may decrease the precision of the precision tools and therefore, vibration measuring and monitoring systems should be used to detect and control the vibration of the principal axis. The vibration measuring and monitoring system can shut down or pause the precision tools when the principal axis has an equal or near frequency to that of the precision tools.

A typical vibration detecting device can obtain changes of vibration by detecting changes of electric potential difference using a detecting coil moving in a magnetic field. However, the magnetic field is asymmetric, which cause the vibration detecting device to have a narrow detecting precision. Furthermore, the vibration detecting device cannot be used to detect a weak vibration.

Referring to FIG. 7, a typical vibration detecting device is shown. The vibration detecting device is used to detect vibration of a bearing 20. The vibration detecting device includes an accelerometer 21, a spring 22, a driving rod 23, a supporting base 24, a cover 25, and a cylinder 26. The driving rod 23 contacts a non-rotating surface of the bearing 20. The driving rod 23 can transfer the vibration of the bearing 20 to the accelerometer 21 through the spring 22. The accelerometer 21 can convert the vibration into an electric signal. The electric signal is output into an analysis device for analyzing. However, the vibration detecting device can only detect the vibration of the bearing 20 when contacting the surface of the bearing 20, it cannot be used for detecting vibration of a rotating axle of a precision tool, since the rotating axle is rotating at high speed.

Therefore, a vibration measuring and monitoring system, which overcomes the above-mentioned problems, is desired.

SUMMARY

In one embodiment, a vibration measuring and monitoring system for an object includes a laser unit, a laser sensor unit, and a processor. The laser unit is used for emitting a laser beam. The laser sensor unit is used for receiving the laser beam, and the laser sensor detects a light intensity signal of the laser beam. The processor is used for processing the light intensity signal of the laser beam. The object is partially disposed between the laser unit and the laser sensor unit. The laser beam crosses the object and is received by the laser sensor unit. The processor obtains a vibration signal by processing the light intensity signal.

Other advantages and novel features will become more apparent from the following detailed description when taken in conjunction with the accompanying drawings.

BRIEF DESCRIPTION OF THE DRAWINGS

Many aspects of the vibration measuring and monitoring system can be better understood with reference to the following drawings. The components in the drawings are not necessarily drawn to scale, the emphasis instead being placed upon clearly illustrating the principles of the present vibration measuring and monitoring system. Moreover, in the drawings, like reference numerals designate corresponding parts throughout the several views.

DETAILED DESCRIPTION OF THE EMBODIMENT

Figure 1:
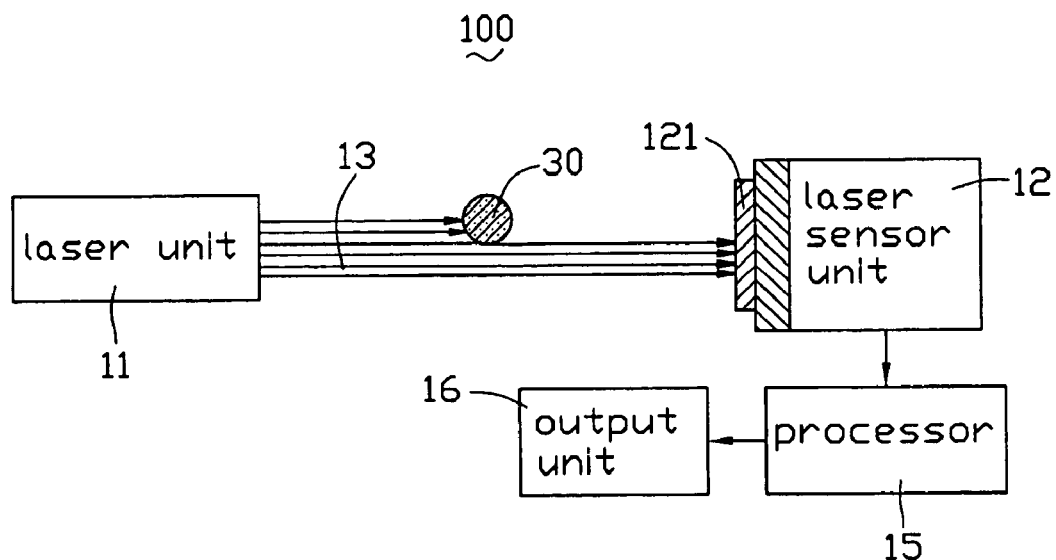
FIG. 1 is a schematic view of a vibration measuring and monitoring system in accordance with a preferred embodiment.
Figure 2:
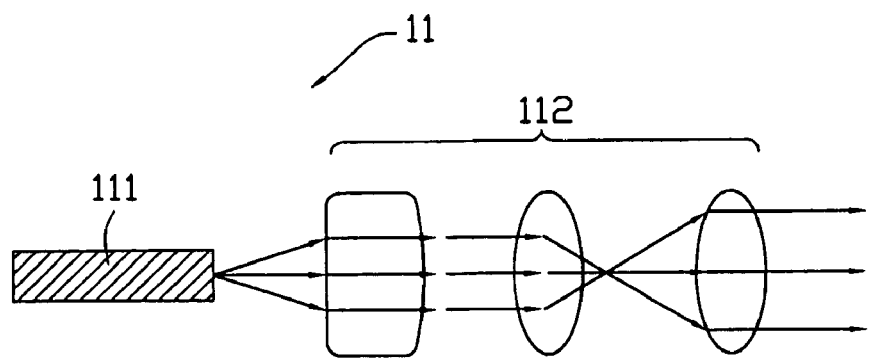
FIG. 2 is a schematic view of the laser unit in FIG. 1.

Referring to FIGS. 1 and 2, in a preferred embodiment, a vibration measuring and monitoring system 100 is used for measuring or monitoring vibration parameters of a rotating axle 30. The vibration measuring and monitoring system 100 includes a laser unit 11, a laser sensor unit 12, a processor 15, and an output unit 16. The laser unit 11 is used for emitting a laser beam 13. The laser unit 11 includes a laser emitter 111 and a lens group 112. The laser emitter 111 is preferably a gas laser emitter, such as, for example, a helium-neon laser emitter. The lens group 112 includes at least one lens. The emitted laser beam 13 is preferably a Gaussian laser beam. The laser sensor unit 12 is disposed opposite to the laser unit 11 for receiving the laser beam 13. The laser sensor unit 12 includes a light sensor 121 for detecting the light intensity of the laser beam 13. The light sensor is typically a photoconductive diode. The laser sensor unit 12 can transform the light intensity to an electric signal, and send the electric signal to the processor 15. The processor 15 is typically a computer system or a micro-processor. The processor 15 can obtain a vibration parameter by analyzing the electric signal. The output unit 16 is connected to the processor 15 for outputting the vibration parameter. The output unit 16 may be a monitor, a printer, or an alarm system.

In use, the laser unit 11 and the laser sensor unit 12 are each positioned at one of two opposite sides of a rotating axle 30. The laser beam 13 is perpendicular to the rotating axle 30, and a part of the laser beam 13 is interdicted by the rotating axle 30. If the rotating axle 30 has a radial vibration when rotating, the vibration may change the light intensity of the laser beam 13 received by the laser sensor 12. The laser sensor 12 transforms the light intensity change to an electric signal, and transfers the electric signal to the processor 15. The processor 15 analyzes the electric signal with a time signal, and obtains a vibration parameter. The vibration parameter may be sent to the output unit 16, such as an alarm system. The vibration parameter is compared to a predetermined vibration parameter in the alarm system. If the vibration parameter is higher than the predetermined parameter, the alarm system may activate an alarm or shut down the rotating axle 30.

It is understood that the vibration measuring and monitoring system 100 can be used to measure or monitor other rotating or non-rotating objects.

Figure 3:
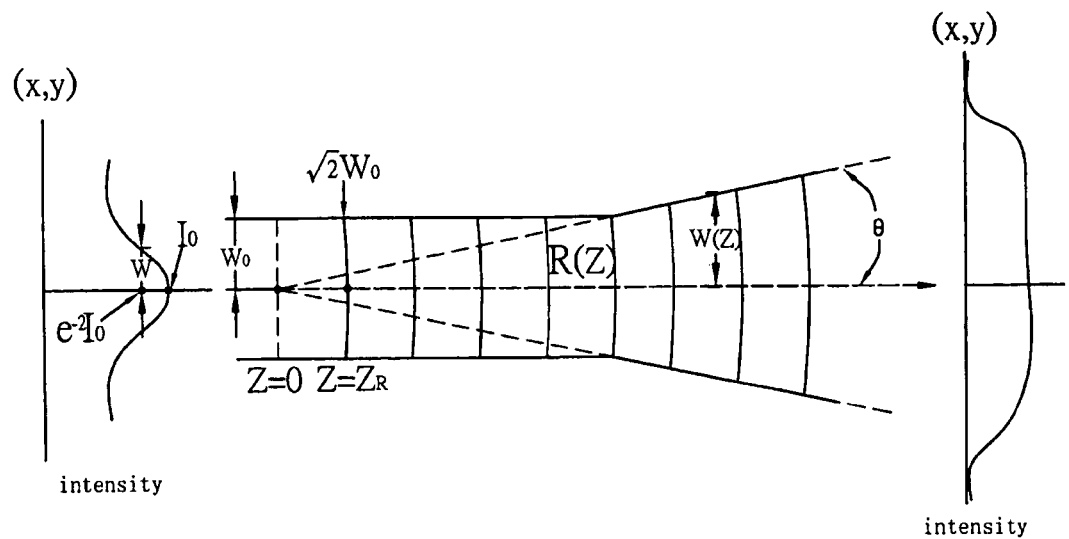
FIG. 3 is a schematic, vibration scanning view of the vibration measuring and monitoring system.

The vibration measuring and monitoring system 100 uses a laser knife edge principal to measure or monitor vibration. FIG. 3 shows an electric field intensity distribution of a Gaussian laser beam. The electric field intensity distribution may be represented by equation-1 shown below.

$$E(r, z) = E_0 \frac{W_0}{W(z)} \begin{array}{l} \times \exp\left(-\frac{r^2}{W^2(z)}\right) \quad \text{(a)} \\ \times \exp\left\{-j\left[kz - \tan\left(\frac{z}{z_R}\right)\right]\right\} \quad \text{(b)} \\ \times \exp\left[-jk\frac{r^2}{2R(z)}\right] \quad \text{(c)} \end{array} \quad \text{(equation-1)}$$

The first item (a) in equation-1 shows an amplitude factor representing a relationship between the laser beam 13 and a vibration swing (r). The second item (b) represents a phase change when the laser beam 13 transmits along a longitudinal direction (z). The third item (c) represents a phase change when the laser beam 13 transmits along a radial direction (r). In equation-1, r is equal to $(x^2+y^2)^{0.5}$, $W_0$ represents beam waist radius, $E_0$ represents electric field intensity at the beam waist, $\lambda$ represents wave length of the laser beam 13, and j is a imaginary number symbol. The laser beam's curvature radius R(0) is infinite at wave front. W(z) represents a spot size or beam size of the laser beam 13 at a position z away from the beam waist. R(z) represents a curvature radius of the laser beam 13 at a position z away the beam waist. Wave number k is equal to $$\frac{2\pi}{\lambda}.$$

If the position z is at the beam waist (z=0), an equation-2 and an equation-3 can be obtained as follows.

$$W(z) = W_0\left[1 + \left(\frac{\lambda z}{\pi W_0^2}\right)^2\right]^{1/2} = W_0\left[1 + \left(\frac{z}{z_R}\right)^2\right]^{1/2} \quad \text{(equation-2)}$$

$$R(z) = \left[1 + \left(\frac{\pi W_0^2}{\lambda z}\right)^2\right] = z\left[1 + \left(\frac{Z_R}{Z}\right)^2\right] \quad \text{(equation-3)}$$

In equation-3, $$Z_R = \frac{\pi W_0^2}{\lambda}$$

defines a Rayleigh range. In a plane which has a distance $Z_R$ away the beam waist, the beam area is double of the area at the beam waist, and the curvature radius R is the smallest.

When the longitudinal direction $Z>>Z_R$, the laser beam's curvature radius R(z) approximates to z, and the beam size of the laser beam W(z) approximates to $$\frac{\lambda z}{\pi W_0}.$$

The Gaussian laser beam is approximately a beam emitted by a spot light source at the beam waist. The divergence angle $\theta$ is approximately represented in equation-4.

$$\theta = \frac{dW(z)}{dz} = \frac{W_0}{Z_R} = \frac{\lambda}{\pi W_0} \quad \text{(equation-4)}$$

Thus it is concluded that the characteristic of a Gaussian laser beam 13 is defined by the beam waist radius $W_0$ and the wave length $\lambda$ of the laser beam 13.

Because the electric field of laser beam 13 changes rapidly, the laser beam 13 is typically measured by detecting the light intensity of the laser beam 13. The light intensity of the laser beam 13 can be represented by equation-5 in a rectangular coordinate as follows.

$$I = E \cdot E^* = I_0 \exp\left\{\frac{-2[(x-x_0)^2 + (y-y_0)^2]}{W^2}\right\} \quad \text{(equation-5)}$$

In equation-5, $x_0$ and $y_0$ is center of the laser beam 13, and light intensity $I_0$ in center of the laser beam 13 is equal to the maximum light intensity $I_{max}$. The light intensity of the laser beam 13 decreases from $I_0$ to $e^{31\ 2}I_0$ ($e^{-2} \approx 1353$) from the center of the laser beam 13 to a desired position. The distance from the center ($I_0$) of laser beam 13 to the position ($e^{-2}I_0$) is defined as the radius of the laser beam 13. W is the spot size of the laser beam at the position where the light intensity drops to $e^{-2}I_0$.

Figure 4:
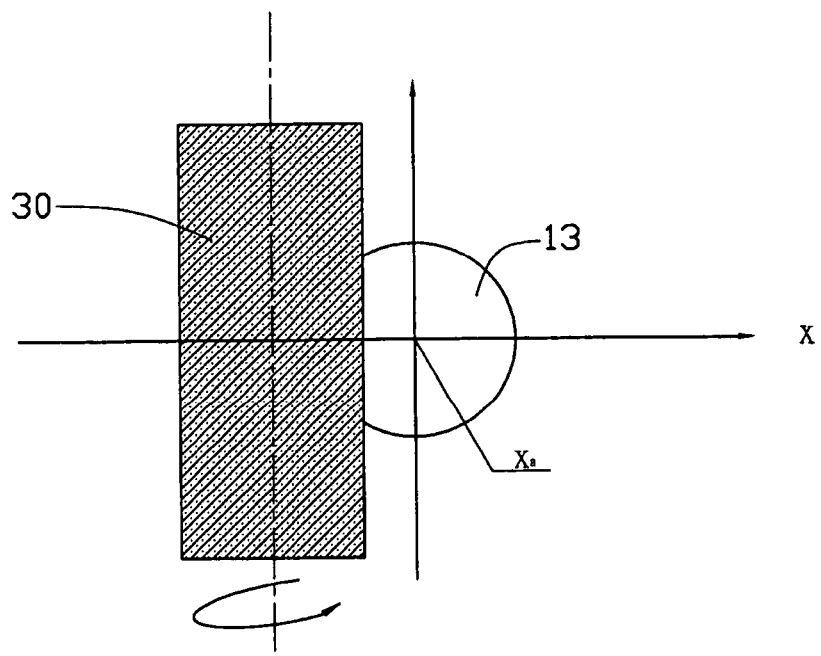
FIG. 4 is a field distribution characteristic view of a Gaussian laser beam.

Referring to FIGS. 1 and 4, assuming a scanning direction of the vibration measuring and monitoring system 100 is along the x axis, the light sensor 121 receives a part of laser beam 13 which is not blocked by the rotating axle 30. The light intensity $S(x_a)$ of the part of laser beam 13 is represented in equation-6.

$$\begin{aligned} S(x_a) &= \int_{-\infty}^{\infty}\int_{x_a}^{\infty} I(x, y)\,dxdy \quad \text{(equation-6)} \\ &= \int_{-\infty}^{\infty}\int_{x_a}^{\infty} I_0 \exp\left\{\frac{-2[(x-x_0)^2 + (y-y_0)^2]}{W^2}\right\}dxdy \\ &= I_0\left(\frac{\pi W^2}{2}\right)^{\frac{1}{2}} \int_{x_a}^{\infty} \exp\left\{\frac{-2(x-x_0)^2}{W^2}\right\}dx \end{aligned}$$

Figure 5:
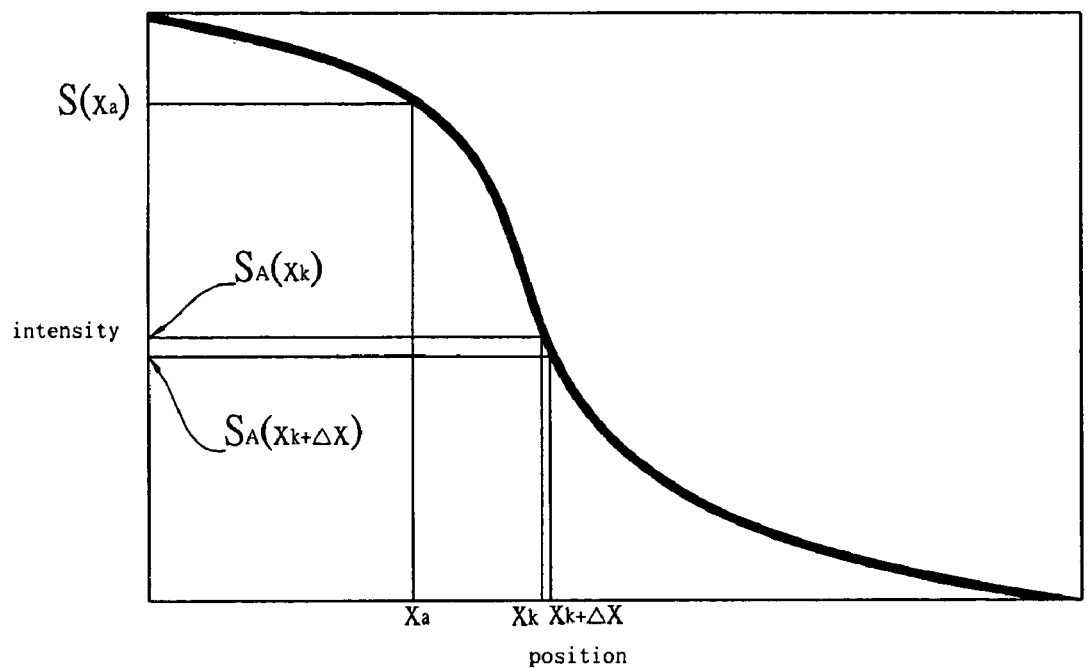
FIG. 5 is a light intensity distribution characteristic curve of the Gaussian laser beam.
Figure 6:
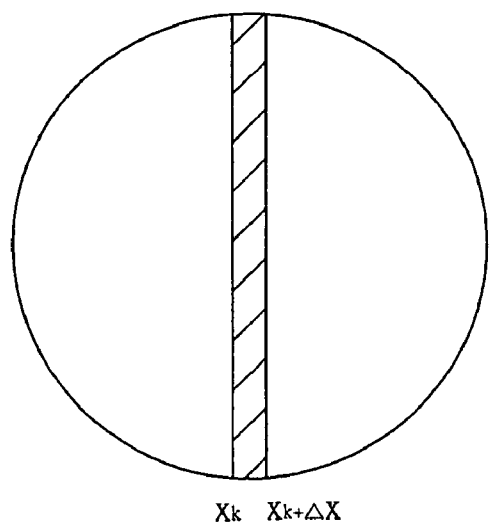
FIG. 6 is a integrated light intensity view of the Gaussian laser beam.
Figure 7:
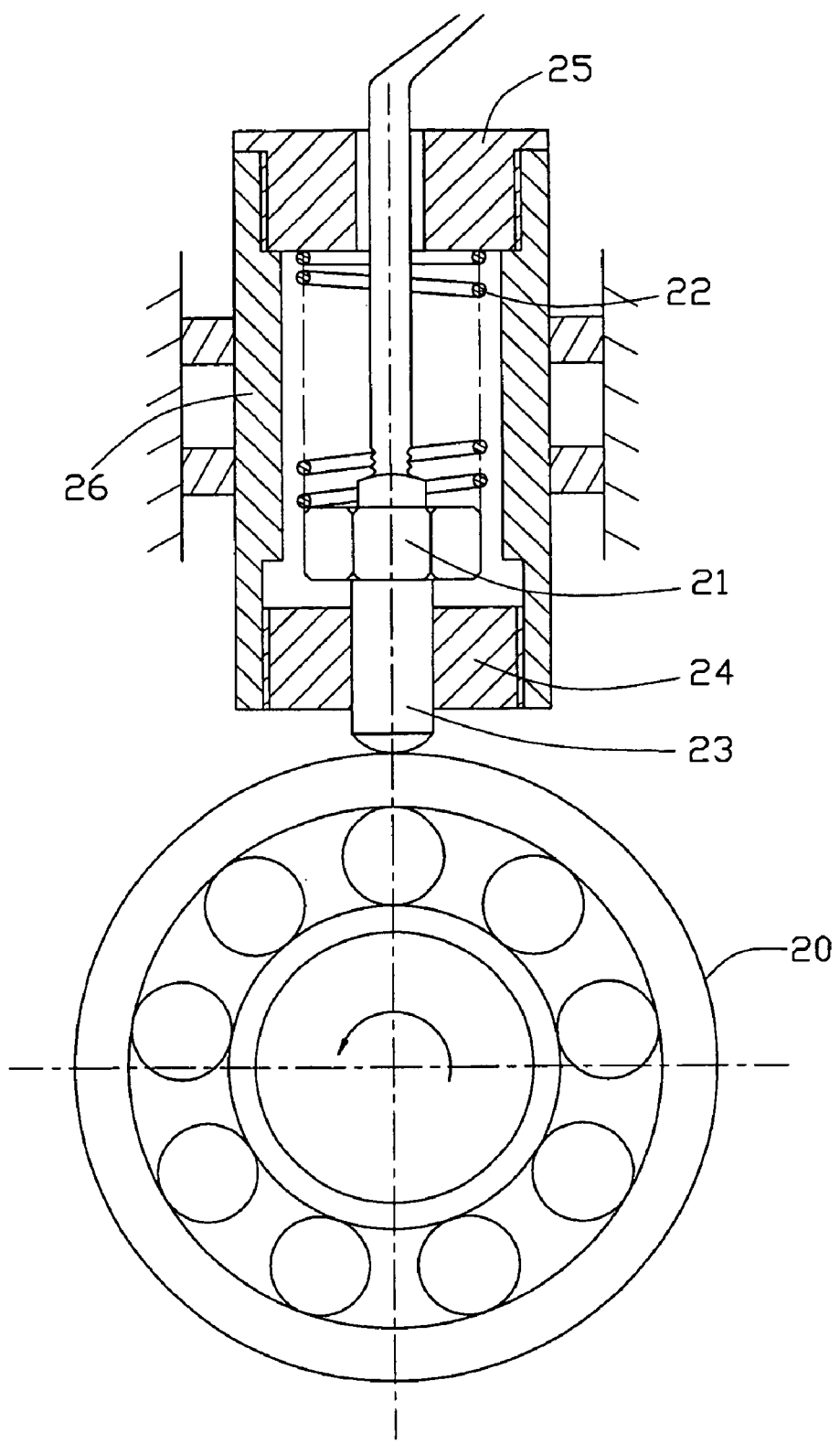
FIG. 7 is a typical vibration detecting device.

A light intensity distribution can be obtained from the equation-6. FIG. 5 shows the light intensity distribution characteristic curve of the Gaussian laser beam. A light intensity difference between a position ($x_k$) and another position ($x_k+\Delta_x$) is represented in equation-7 as follows. The light intensity difference is regarded as an integrated light intensity shown in FIG. 6.

$$S_A(x_k) - S_B(x_k + \Delta_x) = \int_{-\infty}^{\infty} \int_{x_k + \Delta_k}^{x_k} I(x, y) dx dy \quad \text{(equation-7)}$$

The light intensity $S(x_a)$ can be normalization when the total light intensity $S(\infty)$ of the laser beam 13 is divided by the $S(x_a)$, which is represented in equation-8.

$$\overline{S}(x_a) = \frac{S(x_a)}{S(\infty)} = \left(\frac{2}{\pi W^2}\right)^{\frac{1}{2}} \int_{x_a}^{\infty} \exp\left[\frac{-2(x - x_0)}{W}\right] dx \quad \text{(equation-8)}$$

It can therefore be seen that, the vibration measuring and monitoring system 100 uses the laser sensor unit 12 to detects light intensity changes of the laser beam 13. The laser sensor unit 12 transforms the light intensity changes to an electric signal, and the processor 15 can obtain a position of the rotating axle 30 by analyzing the electric signal using equation-7 and equation-8. The processor 15 finally obtains a vibration of the rotating axle 30 by combining the position of the rotating axle 30 with a time axis.

It is believed that the present embodiments and their advantages will be understood from the foregoing description, and it will be apparent that various changes may be made thereto without departing from the spirit and scope of the invention or sacrificing all of its material advantages, the examples here before described merely being preferred or exemplary embodiments of the invention.

What is claimed is:

1. A vibration measuring and monitoring system for an object, comprising:
    a laser unit configured for emitting a laser beam;
    a laser sensor unit configured for receiving the laser beam, the laser sensor detecting a light intensity signal of the laser beam; and
    a processor for processing the light intensity signal of the laser beam so as to obtain a vibration signal in association with a vibration of the object;
    wherein the laser unit and the laser sensor unit are arranged at two sides of the object, the laser beam crosses the object and is received by the laser sensor unit, and the light intensity signal is calculated using the following equation:

$$S(x_a) = \left(\frac{2}{\pi W^2}\right)^{\frac{1}{2}} \int_{x_a}^{\infty} \exp\left[\frac{-2(x - x_0)}{W}\right] dx$$

wherein x is a coordinate dimension: $x_0$ is the position of the center of the laser beam: and W is a spot size of the laser beam at the position where the light intensity of the laser beam drops to $e^{-2}$ times the light intensity of the laser beam at the center of the laser beam.

2. The vibration measuring and monitoring system as claimed in claim 1, further comprising an output unit connected to the processor.

3. The vibration measuring and monitoring system as claimed in claim 2, wherein the output unit is selected from the group consisting of monitor, printer, and alarm system.

4. The vibration measuring and monitoring system as claimed in claim 1, wherein the laser unit comprises a laser emitter and at least one lens.

5. The vibration measuring and monitoring system as claimed in claim 4, wherein the laser emitter is gas laser emitter.

6. The vibration measuring and monitoring system as claimed in claim 5, wherein the gas laser is a helium-neon laser emitter.

7. The vibration measuring and monitoring system as claimed in claim 1, wherein the laser beam is a Gaussian laser beam.

8. The vibration measuring and monitoring system as claimed in claim 1, wherein the laser sensor unit includes a light sensor.

9. The vibration measuring and monitoring system as claimed in claim 8, wherein the light sensor is a photoconductive diode.

10. The vibration measuring and monitoring system as claimed in claim 1, wherein the processor is a computer system.

11. The vibration measuring and monitoring system as claimed in claim 1, wherein the processor is a microprocessor.

12. A vibration measuring system for an object, the measuring system comprising:
    a laser unit configured so as to be located at one side of the object to emit a laser beam crossing the object so that an intensity of the laser beam crossing the object varies according to vibration of the object;
    a laser sensor unit configured so as to be located at an opposite side of the object to receive the laser beam crossing the object, thereby generating an electrical intensity signal according to the intensity of the laser beam crossing the object; and
    a processor configured for processing the intensity signal so as to obtain the vibration of the object;
    wherein the intensity of the laser beam crossing the object is calculated using the following equation:

$$S(x_a) = \left(\frac{2}{\pi W^2}\right)^{\frac{1}{2}} \int_{x_a}^{\infty} \exp\left[\frac{-2(x - x_0)}{W}\right] dx$$

wherein x is a coordinate dimension; $x_0$ is the position of the center of the laser beam; and W is a spot size of the laser beam at the position where the light intensity of the laser beam drops to $e^{-2}$ times the light intensity of the laser beam at the center of the laser beam.

13. The vibration measuring system as claimed in claim 12, further comprising an output unit connected to the processor, the output unit is selected from the group consisting of monitor, printer, and alarm system.

14. The vibration measuring system as claimed in claim 12, wherein the laser unit comprises a laser emitter and at least one lens, and the laser emitter is gas laser emitter.

15. The vibration measuring system as claimed in claim 12, wherein the laser sensor unit includes a light sensor, and the light sensor is a photoconductive diode.

16. A method for measuring vibration of an object, comprising the steps of:
    emitting a laser beam crossing the object so that an intensity of the laser beam crossing the object varies according to vibration of the objects and the intensity of the laser beam crossing the object is represented by the following equation:

$$S(x_a) = \left(\frac{2}{\pi W^2}\right)^{\frac{1}{2}} \int_{x_a}^{\infty} \exp\left[\frac{-2(x-x_0)}{W}\right] dx$$

wherein x is a coordinate dimension; $X_0$ is the position of the center of the laser beam; and W is a snot size of the laser beam at the position where the light intensity of the laser beam drops to $e^{-2}$ times the light intensity of the laser beam at the center of the laser beam;

receiving the laser beam crossing the object with a laser sensor unit and generating an electrical intensity signal thereby; and processing the electrical intensity signal, whereby the vibration of the object is obtained.

17. The method as claimed in claim 16, wherein the laser unit comprises a laser emitter and at least one lens, and the laser emitter is gas laser emitter.

18. The method as claimed in claim 16, wherein the laser sensor unit includes a light sensor, and the light sensor is a photoconductive diode.

19. The method as claimed in claim 16, wherein the electrical intensity signal is processed by a processor.

* * * * *